Oct. 30, 1962  C. J. LUCIA  3,060,730
TRANSMISSION TEST MACHINE
Filed Aug. 11, 1958  4 Sheets-Sheet 3
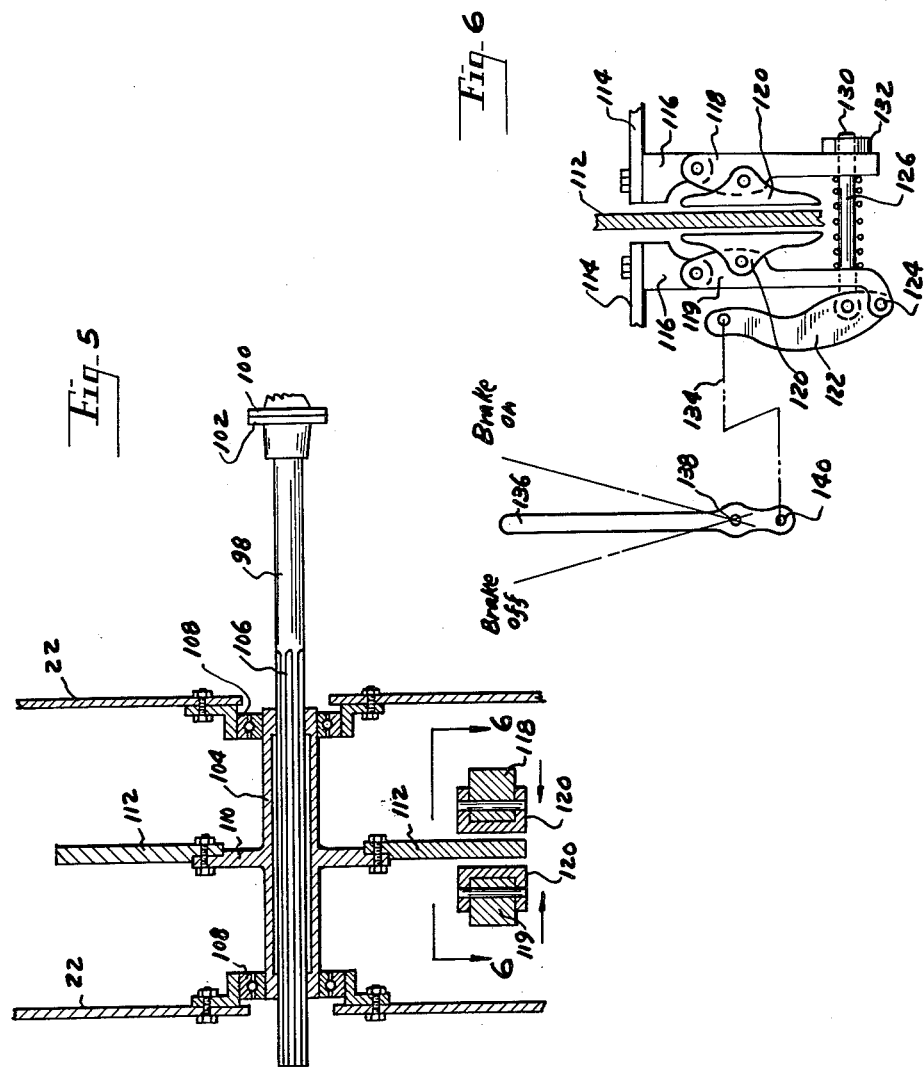
INVENTOR.
CARROLL J. LUCIA.

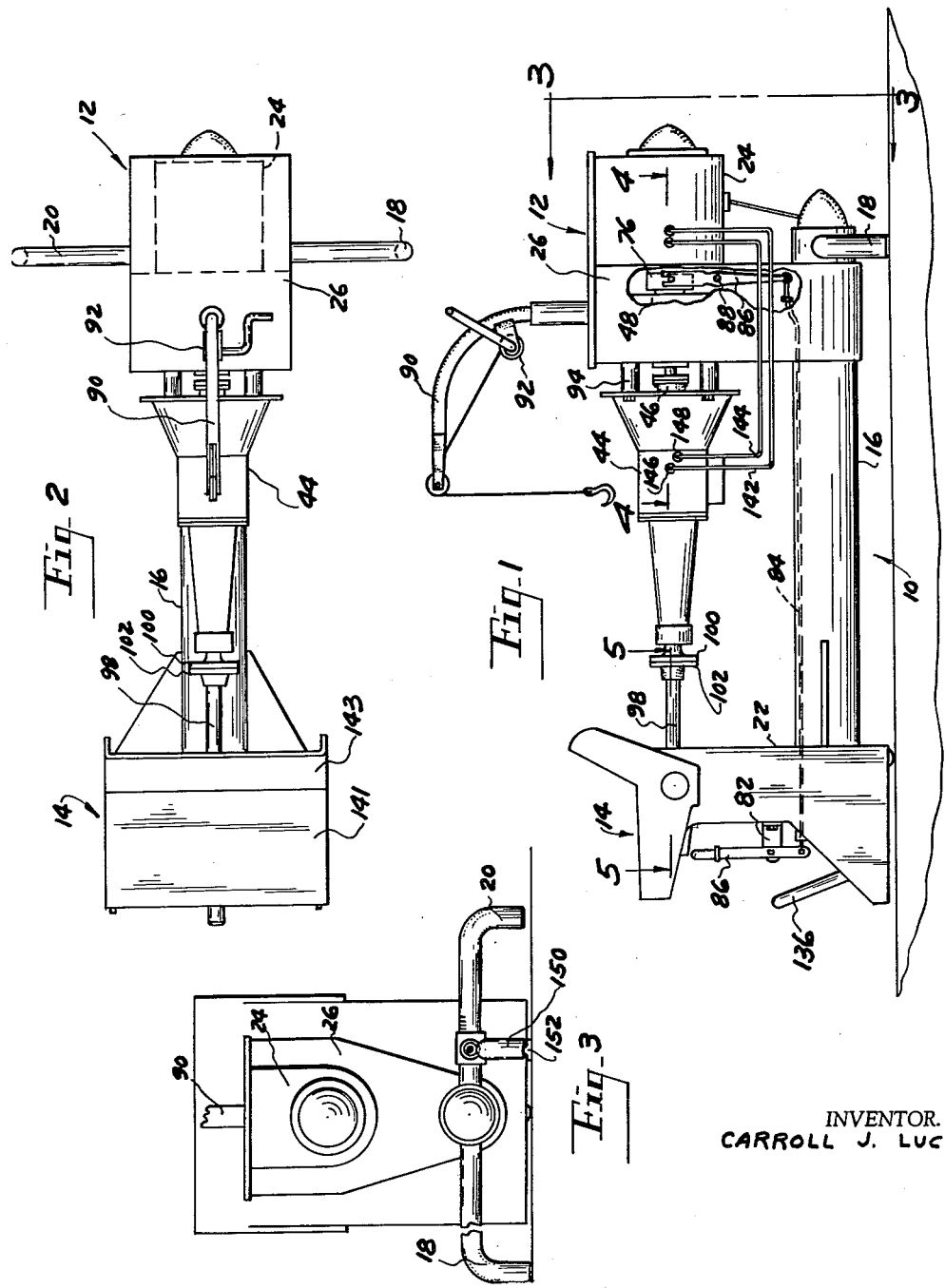
INVENTOR.
CARROLL J. LUCIA

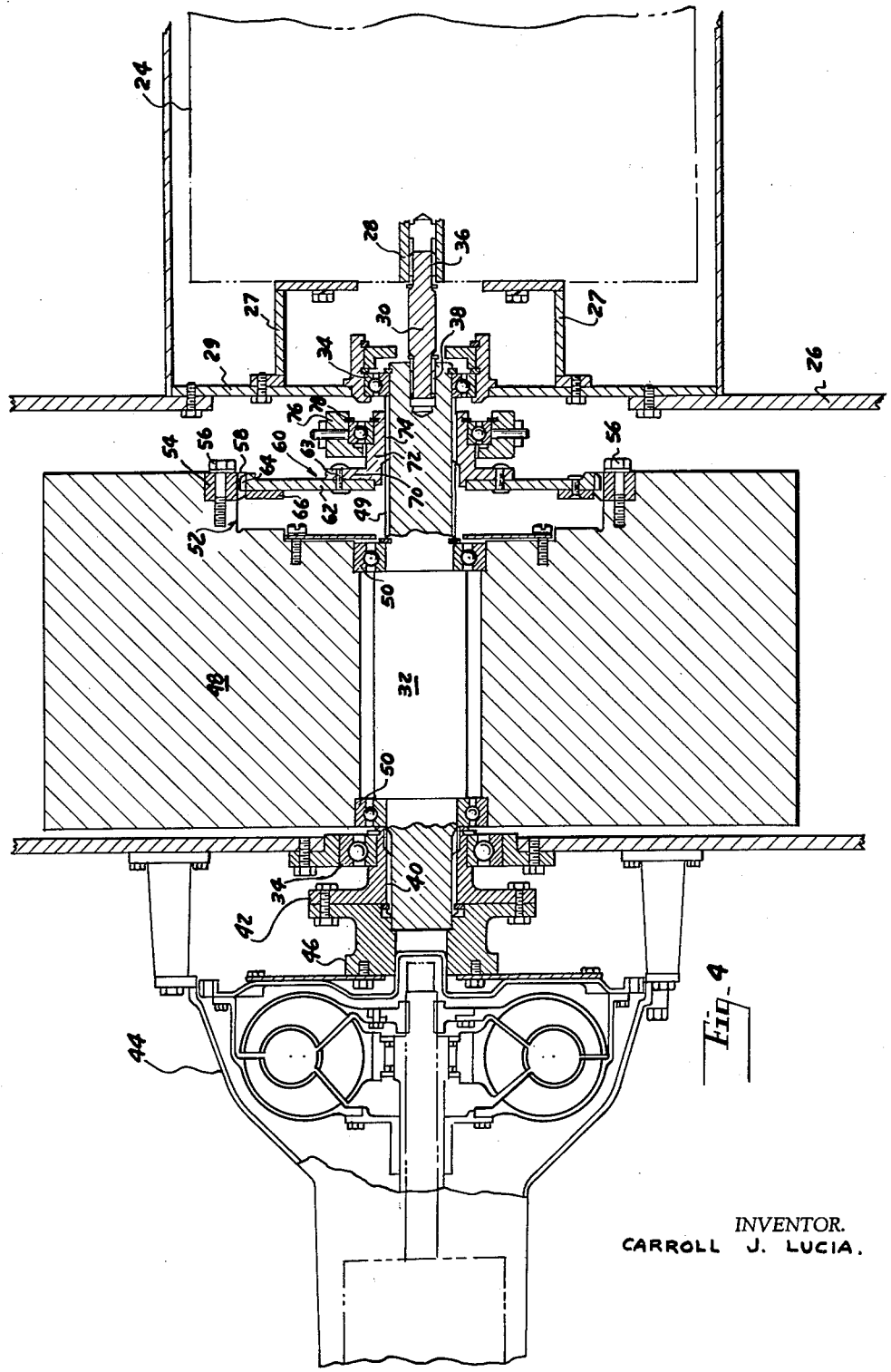

United States Patent Office 3,060,730
Patented Oct. 30, 1962

3,060,730
TRANSMISSION TEST MACHINE
Carroll J. Lucia, Pontiac, Mich.
(600 Prospect Place, Green Bay, Wis.)
Filed Aug. 11, 1958, Ser. No. 754,257
10 Claims. (Cl. 73—118)

This invention relates to equipment for testing transmissions for automotive vehicles and more particularly transmissions of the hydrokinetic type.

With the ever increasing popularity of automatic transmissions there is an ever increasing need for a practical and effective testing machine in view of their relatively complex construction. It is common practice to test all factory assembled transmissions before installing them in vehicles; however, service shop and garage testing has been uneconomical because of the high cost of testing machines and the great amount of operator training required. It is common practice in garages to remove a defective transmission from the vehicle, repair or rebuild it, and reinstall it in the vehicle without testing. In effect, the vehicle is used as the testing equipment. In certain types of service operations it is necessary to stock or ship rebuilt transmissions, and in these cases the vehicle is not available for testing and a test machine is required in order to assure satisfactory operation when it is later installed in the vehicle.

Due to the relatively high cost of installing and removing a transmission it is highly desirable that it be thoroughly tested for all its functions immediately after being assembled or rebuilt. Malfunctions are detected, causes diagnosed and corrected, and large savings effected.

In view of the above, it is an object of the present invention to provide a testing device which is characterized by its economy of construction, ease of operation, and completeness of potential testing abilities. This machine is primarily intended for use by service garages and rebuilding shops but has potential usefulness in transmission factories, laboratories, schools, etc.

It is a general object of the present invention to provide a testing device which simulates the operational conditions of the vehicle and is operated in a manner similar to operating the vehicle.

It is an object of the present invention to provide an automatic transmission testing device in which a large flywheel is accelerated to a predetermined speed by a relatively small prime mover, such as a small internal combustion engine, and the kinetic energy stored in the large flywheel subsequently used to produce full designed torque for driving the transmission during full torque testing.

A further object of the present invention is to provide an automatic transmission testing device wherein the amount of torque produced is accurately predetermined by proper selection of speed of a large rotating mass as related to the specific speed and torque characteristics of the hydrokinetic unit comprising a part of the transmission under test.

Another object of the present invention is to provide an automatic transmission testing device capable of operation throughout the entire input speed range for which the transmission is designed to operate in the vehicle.

Another object of the present invention is to provide an automatic transmission testing device in which the torque transmitted during the full torque testing is accurately measured.

A still further object of the present invention is to provide an automatic transmission testing device wherein proper transmission fluid test temperatures are quickly established and controlled.

It is another object of the present invention to provide a mechanism for testing hydraulic transmissions in which the hydraulic fluid from the transmission unit being tested is circulated through the cooling jacket surrounding the test mechanism's prime mover.

These and further objects of the present invention will become apparent from the following full description of the attached drawings, in which:

FIGURE 1 is a side elevational view of the testing device of the present invention with a transmission being mounted thereon;

FIGURE 2 is a plan view of the device disclosed in FIGURE 1;

FIGURE 3 is a partial end elevational view of the invention shown in FIGURE 1;

FIGURE 4 is a sectional view of a portion of the device shown in FIGURE 1 and taken along section lines 4—4 of that figure;

FIGURE 5 is a sectional view taken along section lines 5—5 of FIGURE 1;

FIGURE 6 is a sectional view taken along section lines 6—6 of FIGURE 5; and

Figure 7:
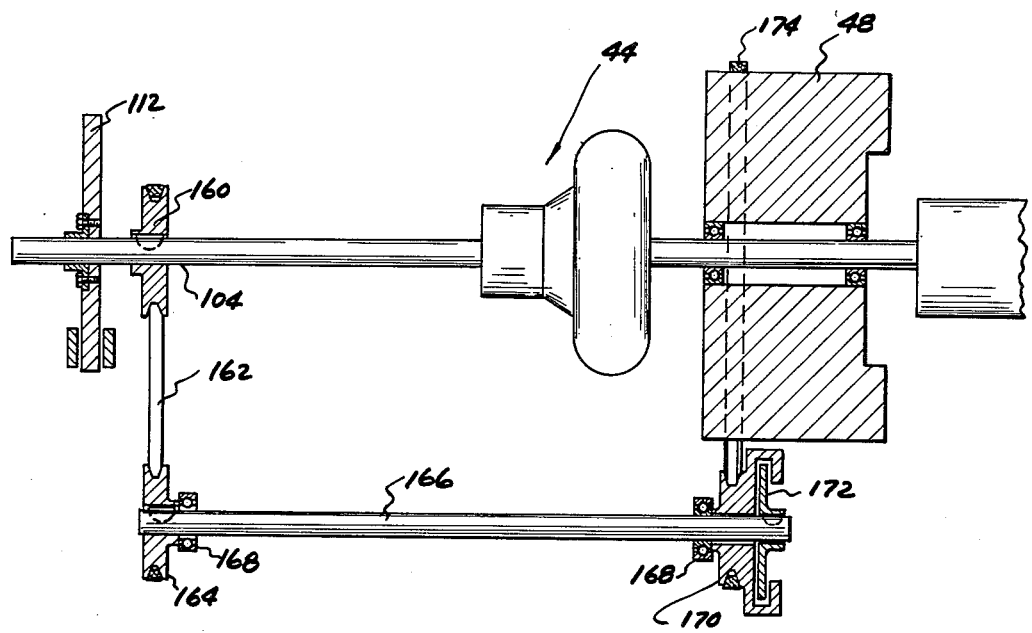
FIGURE 7 is a diagrammatic elevational view of the invention shown in FIGURE 1.

Referring to the drawings for a complete description of the present invention, like reference numerals define like parts throughout the various views. In FIGURE 1 the preferred form of the automatic transmission testing device 10 is disclosed in which the right-hand end is the prime mover end 12 and the left-hand end is the operating position end 14.

The device 10 has a longitudinally extending frame member 16 which serves to join and support the two end portions 12, 14. Transversely extending from the prime mover end 12 of the frame member 16 are two legs 18 and 20. These legs 18, 20 provide the main support for the unit 10. At the operator's end 14, a cabinet 22 provides the remaining support. Thus the cabinet 22, and the two legs 18, 20 constitute a three-legged support for the unit which is adaptable to any unevenness of the floor upon which the unit 10 is installed.

At the prime mover end 12 an internal combustion engine 24 is disposed. The engine 24 is used to drive the transmission through the appropriate testing situations as will be more fully described below. The engine 24 is mounted, in part, within a cabinet 26 supported on the frame 16.

FIGURE 4 discloses the internal construction of the engine's connection with the associated transmission drive mechanism. The engine 24 is mounted on brackets 27 affixed to a vertical support 29 which is connected to the frame 16 for rigidity. The crankshaft 28 of the engine drives into a spindle shaft 30 which in turn is connected to a second short shaft 32. Shafts 30 and 32 are rotationally supported by means of ball bearings 34 disposed at either end of the second shaft 32. The spindle shaft 30 has external splines 36 and 38 at its two ends for engagement with internal splines on the end of the crankshaft 28 and in the right-hand end of the shaft 32.

The left-hand end of the shaft 32 is externally splined at 40 to receive an internally splined flanged member 42. The flange member 42 is employed for coupling to the input drive of the particular transmission unit 44 being subjected to test by means of an intermediate flange 46. A multiplicity of intermediate flanges 46 are provided of varying dimension to accommodate the number of different transmission types to be tested and their varying input drive configuration.

The right-hand end of the short shaft 32 is provided with an axial extension of splines 49. The central portion of the short shaft 32 journals a flywheel 48 of very substantial weight by means of ball bearings 50. The flywheel 48 is provided with a recessed portion 52 in its right-hand face which is of double depth or stepped. A ring member 54 is positioned within the recessed portion of greater diameter and secured to the wheel 48 by means such as bolts 56. The inner surface of the ring 54 is splined as at 58.

An axially slidable clutch assembly 60 is positionable to be engageable with the splines 58 of ring 54 and splines 49 of short shaft 32. The clutch member 60 is an assembly composed of disc 62 having spline teeth 64 formed on its peripheral edge to complement and engage spline 58. Disc 62 also has a friction member 66 bonded to the outer edge of its left-hand face. The inner portion of the disc 62 is secured by rivets 63 to radial flange portion 70 of clutch component member 72. Member 72 engages the splines 49 of the short shaft 32 by means of its own splines 74. As disclosed in the drawing, the splines 49 extend axially permitting the longitudinal displacement of the clutch assembly 60. In contrast, the splines 58 of ring 54 extend for only a portion of the depth of recess 52. Therefore, clutch assembly 60 is in continuous engagement with the short shaft 32 but can be moved to engage or to be disengaged from the flywheel 48.

Axial displacement of the clutch assembly 60 is achieved by means of a collar member 76 which is secured to member 72 of clutch assembly 60 by means of a ball bearing 78 having the capacity to transmit the thrust forces necessary for axial displacement.

Means are provided, as disclosed in FIGURE 1, for the axial shifting of the collar 76 and thus the clutch assembly 60. At the operator's end 14 of the testing unit 10 there is provided, externally of the cabinet 22, a manual actuating lever 80 of the first class which is pivotally connected to a fulcrum member 82 secured to the cabinet 22. There is also pivotally connected to the lever 80 a link member 84 which extends from the operating end 14 to the prime mover end 12. The link 84 extends through the interior of tubular frame member 16 thereby concealing it from view and maladjustment.

The right-hand end of the link 84 is pivotally joined to a first class lever 86 having a fulcrum 88 secured to structure 26. The lever 86 functions as a clutch dog and is joined to the collar 76. It is apparent that with this combination manual manipulation of the lever 80 can cause the clutch assembly 60 to shift axially between two extreme positions. The purpose of this control will be more fully described below.

In addition to the mechanism previously described, there is also associated with the prime mover end 12 of the rig 10, a small crane 90 and winch 92 on top of the cabinet structure 26 for use in hoisting transmission units to be tested into position and out.

The input drive end of the transmission 44 under test is operatively connected to the prime mover or engine 24 as previously described. Support members 94 provide rigid mounts for the casing of the transmission unit 44 and are secured to the cabinet structure 26.

The output or drive shaft of the transmission unit 44 is connected to the tail shaft 98 of the test unit 10 by means of matching flanges 100 and 102. A plurality of flanges 102 are provided to adapt the testing machine to various transmission outputs. Referring now to FIGURE 5 for disclosure of the construction of the mechanism at the operator's end 14, the tail shaft 98 is mounted within an internally splined hollow shaft 104 and has splines 106 to complement the splines of shaft 104. Shaft 104 is journaled to rotate in ball bearings 108. The splined arrangement permits axial adjustment of the tail shaft 98 to accommodate transmissions of varying length.

A radial flange 110 extends centrally from the hollow shaft 104 and carries a relatively large disc 112 bolted thereto. Disc 112 constitutes both a flywheel and the disc element of a disc brake. The braking assembly shown in FIGURE 6 is composed of support framing 114 which has pivot members 116 secured thereto on either side of the disc 112. Pivotably secured to the members 116 are second class levers 118, 119 which have brake shoes 120 affixed near their midpoint. An actuating lever 122 is pinned at 124 to the lower end of the lever 119. A pull rod 126 is connected to a midpoint of the lever 122 and extends to the lower end of the lever 118. A spring is coaxial about the rod 126 and serves to separate the levers 118 and 119 so as to disengage the brake shoes 120 from the disc 112. The end 130 of the rod 126 is threadably engaged by a nut 132 which permits adjustment of the separation of the levers 119, 118. The end of the actuating lever 122 opposite from where the pin 124 is located, pivotally receives linkage indicated by 134. A manual brake lever 136 fulcrumed at 138 and having one of its ends joined to the linkage 134 constitutes the control to apply the brake mechanism of FIGURE 6.

Again referring to FIGURE 3 a movable fulcrum pedestal 150 is provided of a length sufficient to prevent the right leg 20 from contacting the floor. The pedestal 150 can be adjusted to constitute one of the supports of the machine and is located a predetermined distance from the center of gravity of the machine such that the weight of the machine causes a counterclockwise moment about the foot 152 of the pedestal 150. Thus the machine has three supports as shown in FIGURE 3. If a clockwise moment is applied to the frame of the machine of a magnitude greater than the counterclockwise moment produced by the weight of the machine, the machine will move about the foot 152 acting as the fulcrum point until the right leg 20 contacts the floor. Since clockwise torque is induced into the frame of the machine as a reaction of the flywheel, inertial means are thus provided to indicate the amount of torque induced by the inertia flywheel 48, and the total torque directed into the input members of the transmission 44 under test can be accurately determined.

The operating position is provided with a desk surface 141 and an instrument panel 143. The instruments provided are of the conventional type for the testing to be done and include engine or transmission input speed, tail shaft speed, transmission fluid temperature, and the various internal pressures of the transmission taken at appropriate check points in its controls.

As previously described, the crane 90 is employed to place the transmission unit to be tested into position. Once hoisted into place, the casing of the unit 44 being tested is secured by means of the rigid supports 94. The input flange 46 is then bolted to the flange 42 of the prime mover or engine 24. The output flange 100 is bolted to the flange 102 of tail shaft 98. Thus positioned, hydraulic conduits 142 and 144 are then coupled to the inlet 146 and outlet 148 of unit 44 which are normally employed to circulate transmission fluid through a cooler located within the cooling radiator of the motor vehicle with which it is associated. Conduits 142 and 144 are also connected to the cooling jacket of the engine 24. For this purpose, engine 24 may be a "conversion" of a normally water-cooled internal combustion engine in which its water jacket is used as a portion of the circulating system. An additional thermostatically controlled heat exchanger may be added to the system to control fluid temperature. The use of an additional heat exchanger depends upon the rating of the engine used and the size of the transmission being tested.

FIGURE 7 shows additional and optional means for accelerating the large flywheel 48 to provide a more complete road effect. A V-belt sheave pulley 160 is affixed by fastening means such as a key to the shaft 104 and connects through a V-belt 162 to a V-belt sheave pulley 164 mounted on an extended layshaft 166. Shaft 166 is rotationally supported by means of bearings 168 disposed at both of its ends.

At the engine end of the shaft 166 a V-belt sheave pulley 170 is rotatably mounted. A clutch device 172 forms a selectable connection between the pulley 170 and the shaft 166. Conventional synchronizing means (not shown) are provided so that clutch 172 may be engaged when the clutch assembly 60 is in neutral. A V-belt 174 provides a connecting means between wheel 48 and pulley 170. It will be seen that the belted layshaft construction described serves to prevent sudden change in transmission output shaft speed when shifts occur within the transmission under test because of its connection to the heavy mass of wheel 48.

With this additional means incorporated, the full torque test is started by the operator placing the transmission selector lever in Drive position and accelerating under full engine throttle until the large flywheel 48 attains a desired predetermined speed, usually about 2000 r.p.m. This is done with the clutch 172 engaged and clutch 60 disengaged. During this period the transmission operates through its upshifting gear ratios and the reduction ratio incorporated in the V-belt drive to accelerate the large flywheel at a maximum rate. The lever 80 is then moved to engage the clutch 60 with friction surface 66 engaging inner surface of the recessed portion 52 of flywheel 48, thus positively synchronizing the speed of engine 24 with the speed of flywheel 48. The lever 80 is then abruptly moved to effect direct engagement of splines 64 with teeth 58 of the ring 54 affixed to the wheel 48. Lever 80 is provided with synchronizing means to disengage clutch 172 when lever 80 is in other than neutral position, thereby causing a disconnect of the layshaft drive.

The transmission testing unit 10 operates in the following fashion: After the transmission 44 is installed on the test machine 10 the appropriate pressure gauges, throttle and selector linkages, and transmission fluid conduits are connected and the engine 24 is started and controlled to operate at low speed. For the initial tests the pressure gauges are observed in all combinations of selector positions and throttle position and checked against data established as normal. Typically, the selector is then placed in Drive position, the transmission throttle lever placed in Idle position, and the engine accelerated slowly until all upshifts occur in the transmission 44. The speed is then reduced to approximately 400 r.p.m. and the downshifts are noted and evaluated. The throttle lever of the transmission 44 might then be placed at the Full position and the engine throttle opened to cause the engine to accelerate until all upshifts occur and are noted and evaluated. The speed is then reduced and downshifts are checked. This general procedure might be continued in all its variations appropriate to the transmission 44 under test while continuing to observe pressure gauges, shift points, sounds, tailshaft tachometer, etc. for abnormal behavior. At times it may be necessary to operate at speeds as high as 6000 r.p.m. and with the transmission selector in all of the Forward ranges, Neutral, and Reverse. Generally speaking, the transmission 44 is being operated in all respects as it does during the multitude of assorted vehicle maneuvers except no torque is transmitted. Up to this point the tailshaft brake remains disengaged except for instances where the operator may desire to hasten deceleration for convenience and also to control output speed in the range below 500 r.p.m. to simulate the vehicle coming to a complete stop.

The large flywheel 48 remains disconnected up to this point and therefore performed no function in the just described portion of the test. The disc 112 of the tailshaft brake, however, by virtue of its high inertia provided the road effect, stabilizing output shaft speeds such that when shifts within the transmission 44 occurred, the engine speed changed substantially while the road speed changed but slightly, thereby simulating the vehicle condition where the output shaft is connected to the driving wheels.

The torque test might normally be the next phase in the test procedure. Preparatory to making the torque tests, the large flywheel 48 must be connected and then accelerated by the engine 24 to a predetermined speed, usually about 1700 r.p.m. but sometimes as high as 2800 r.p.m. This is done by pulling the flywheel clutch lever 80 with engine power on until the flywheel speed is synchronous with the engine speed then abruptly pushing the lever forward, effecting engagement of the spline clutch 58—64. The transmission selector is moved to the desired position, usually Low. The engine 24 is operated then at full power until the desired flywheel speed is reached which might require as much as one minute. Energy has now been stored and preparations are complete for executing the first of a series of torque checks in rapid succession. The tailshaft brake 112—120 is applied abruptly and positively stopping the tailshaft 98 which in this moment exactly establishes the condition of a full power stall test as previously described. The large flywheel 48 decelerates several hundred r.p.m. in a time interval of several seconds at the end of which the transmission selector is moved to a new position, the tailshaft brake 112—120 released and the engine 24 reaccelerates the large flywheel 48 back to designed stall speed. The process is repeated until all tests are completed including Reverse. The flywheel 48 is then disconnected. The modified construction of FIGURE 7 may be used to get the wheel 48 initially up to speed.

During all of the stall checks the operator observes the torque indicator and notes general response, indicating slippage or other malfunctioning of the transmission 44.

A final phase of the test might be a careful observance of temperatures and pressures, since the stall checks cause fluid temperatures to quickly rise to the thermostatically controlled proper test temperature. With the engine 24 operating at the low speed of approximately 400 r.p.m., and the selector moved successfully to all driving ranges, and the transmission throttle lever positioned in the full open position an accurate evaluation can be made of the ability of the pumps to maintain proper pressures in all the hydraulic circuits. Excessive and abnormal leakage can also be detected and diagnosed in this manner. A slight deficiency at moderate temperatures is usually indicative of serious deficiency at the high temperatures attained during many types of vehicle operation. For a more thorough check the tailshaft brake 112—120 can be applied and the engine 24 operated at full throttle until high temperatures are reached and the seriousness of low pressures thoroughly evaluated.

It should be understood that in practice the test procedures might be shortened to more practical limits, checking the most important functions only, but should a defect be detected, the test machine 10 then will be used with improvised procedures in an attempt to diagnose the cause and recommend corrective action.

In factory testing automatic transmissions the test machine is constructed to test only the make and model transmission in current production. However, a service testing machine must be designed to accommodate a multiplicity of makes and models which are physically different and also whose functional operations vary over a wide range. In the developed art of quality testing automatic transmissions certain basic checks are made which are direct proof of proper and improper functioning.

In testing a typical automatic transmission on a typical test the following are basic procedures:

(1) Install the transmission on the test machine and connect pressure gauges to the primary hydraulic circuits, connect conduits for transmission oil, temperature control, connect linkage to Selector Valve and Throttle Valve.

(2) Testing usually starts by operating at slow input speeds and observing all pressures and response when the throttle lever is moved progressively through Forward ranges and Reverse. Then speed is varied throughout the operating range and pressures and shift points are carefully observed.

(3) The capacity of an automatic transmission to transmit torque is evaluated by conducting a full power stall check similar to that conventionally conducted by automobile mechanics in checking the automatic transmission when installed in the vehicle. A stall check is common practice and consists of holding the output of the transmission against rotation while inducing full engine torque to the input member of the transmission. The designed stall speed is a basic characteristic of the hydrokinetic unit of the automatic transmission and if known the torque transmitted is also known, since the torque and speed relationship is fixed in all hydrokinetic devices. On application of proper torque, deviations from known designed stall speed indicate slippage within the transmission or other malfunctioning and conversely deviations from proper speed at proper torque indicates malfunctioning. A transmission which functions properly during a full power stall check usually functions properly for all other operating conditions, since the greatest torque values occur under stall conditions.

The foregoing description constitutes the preferred form of the present invention; however, it is to be understood that other forms and alternative constructions may occur to those skilled in the art without departing from its scope and spirit.

I claim:

1. A machine for testing vehicle transmissions comprising first and second support structures, means for operably suspending a to-be-tested transmission between said structures, a prime mover mounted at said first structure, said prime mover having means adapted to drive a transmission input member, a flywheel of substantial mass rotatably mounted at said first structure, a clutch device for selectively securing said flywheel to said prime mover means, means at said second structure for rotatably receiving a transmission output member, said later means comprising a second flywheel and a brake for holding said second flywheel against rotation, power transmitting means selectably connecting said first flywheel with said second flywheel.

2. A machine for testing transmissions comprising a prime mover adapted to drive a transmission input member, a brake fitted to selectively hold a transmission output member against rotation, a flywheel, clutch means for selectively connecting said flywheel to the transmission input member, power transmitting means selectively connecting said flywheel to the transmission output member.

3. A transmission testing machine having a prime mover, a first flywheel and a second flywheel, means for drivingly connecting said prime mover to a transmission input, means for selectively drivingly connecting said first flywheel to said transmission input, means for drivingly connecting a transmission output to said second flywheel, and power transmitting means for drivingly connecting said second flywheel and said first flywheel.

4. The combination of claim 3 wherein said first and second flywheels and said prime mover are in axial alignment.

5. A transmission testing machine having a prime mover and means for drivingly connecting said prime mover to a transmission input, a flywheel and clutch means for selectively drivingly connecting said flywheel to said transmission input, and power transmitting means for selectively drivingly connecting said flywheel to a transmission output.

6. A transmission testing machine having a prime mover and means for connecting said prime mover to a transmission input, a rotatably mounted flywheel, means for selectively connecting said flywheel to either a transmission output or said transmission input.

7. A transmission testing machine having a prime mover, an output shaft extending from said prime mover, means for connecting said shaft to a transmission input, a flywheel rotatably mounted on said shaft, clutch means adapted for selective engagement of said flywheel and said shaft, and power transmitting means adapted to connect said flywheel to a transmission output.

8. A testing machine and an automatic transmission operably connected to said machine, a prime mover having an output shaft connected to the input of said transmission, a flywheel rotatably mounted on said shaft, clutch means adapted to engage said flywheel to said shaft, a second flywheel connected to the output of said transmission, brake means adapted to hold said second flywheel against rotation, power transmitting means including a clutch means adapted to drivingly connect said transmission output and said first mentioned flywheel.

9. A torque sensitive support for a machine for testing rotating mechanisms, said support including three main supporting legs, a fourth supporting leg of greater length than two of said first mentioned legs, said fourth leg being movable between said two legs, said support being rockable about said fourth leg in response to torque reaction.

10. The combination of claim 9 in which said fourth leg is positionable relatively near a vertical plane passing through the center of gravity of said machine and one of said legs.

References Cited in the file of this patent

UNITED STATES PATENTS

| | | |
|---|---|---|
| 1,424,987 | Clark | Aug. 8, 1922 |
| 1,595,717 | Giannattasio | Aug. 10, 1926 |
| 1,644,876 | Domizi | Oct. 11, 1927 |
| 2,388,425 | Lund | Nov. 6, 1945 |
| 2,589,710 | La Coste et al. | Mar. 18, 1952 |
| 2,597,450 | Cline | May 20, 1952 |
| 2,918,822 | Mann | Dec. 29, 1959 |